US011120937B2

(12) United States Patent
Zabaco

(10) Patent No.: US 11,120,937 B2
(45) Date of Patent: Sep. 14, 2021

(54) HIGH CURRENT, LOW EQUIVALENT SERIES RESISTANCE PRINTED CIRCUIT BOARD COIL FOR POWER TRANSFER APPLICATION

(71) Applicant: Futurewei Technologies, Inc., Plano, TX (US)

(72) Inventor: Jorge Zabaco, San Diego, CA (US)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 5 days.

(21) Appl. No.: 16/570,035

(22) Filed: Sep. 13, 2019

(65) Prior Publication Data

US 2020/0035402 A1 Jan. 30, 2020

Related U.S. Application Data

(60) Continuation of application No. 15/725,530, filed on Oct. 5, 2017, now Pat. No. 10,431,372, which is a
(Continued)

(51) Int. Cl.
*H01F 27/28* (2006.01)
*H02J 50/12* (2016.01)
(Continued)

(52) U.S. Cl.
CPC ..... *H01F 27/2804* (2013.01); *H01F 17/0013* (2013.01); *H01F 38/14* (2013.01);
(Continued)

(58) Field of Classification Search
CPC .. H01F 27/2804; H01F 17/0013; H01F 38/14; H01F 41/041; H01F 2017/002;
(Continued)

(56) References Cited

U.S. PATENT DOCUMENTS 5,446,311 A 8/1995 Ewen et al.
5,777,539 A 7/1998 Folker et al.
(Continued)

FOREIGN PATENT DOCUMENTS

CN 1804143 A 7/2006
CN 101202149 A 6/2008
(Continued)

OTHER PUBLICATIONS

3GPP TS 36.300 V0.9.0(Mar. 2007),3rd Generation Partnership Project;Technical Specification Group Radio Access Network;Evolved Universal Terrestrial Radio Access (E-UTRA)and Evolved Universal Terrestrial Radio Access Network(E-UTRAN);Overall description;Stage 2(Release 8),total 82 pages.
(Continued)

*Primary Examiner* — Dinh T Le
(74) *Attorney, Agent, or Firm* — Alejandro Daniel Munoz

(57) ABSTRACT

An apparatus for a multilayer printed circuit board (PCB) coil, comprising: a first coil layer of a PCB; a plurality of vias coupled to and distributed to cover substantially the surface of the first coil layer within the PCB; and a second coil layer of the PCB and coupled to the vias to cover substantially the surface of the second coil layer, wherein the vias are positioned between the first coil layer and the second coil layer and enable substantially high current and low equivalent series resistance (ESR) for the multilayer PCB coil.

19 Claims, 4 Drawing Sheets

Related U.S. Application Data continuation of application No. 14/586,384, filed on Dec. 30, 2014, now Pat. No. 9,818,527, which is a division of application No. 13/535,059, filed on Jun. 27, 2012, now abandoned.

(60) Provisional application No. 61/600,969, filed on Feb. 20, 2012.

(51) Int. Cl.
| | | |
|---|---|---|
| *H01F 17/00* | (2006.01) | |
| *H01F 41/04* | (2006.01) | |
| *H01F 38/14* | (2006.01) | |
| *H02J 7/02* | (2016.01) | |
| *H04B 5/00* | (2006.01) | |
| *H02J 5/00* | (2016.01) | |

(52) U.S. Cl.
CPC ............ *H01F 41/041* (2013.01); *H02J 5/005* (2013.01); *H02J 7/025* (2013.01); *H02J 50/12* (2016.02); *H04B 5/0037* (2013.01); *H01F 2017/002* (2013.01); *H01F 2027/2809* (2013.01); *Y10T 29/4902* (2015.01)

(58) Field of Classification Search
CPC ... H01F 2027/2809; H02J 50/12; H02J 5/005; H02J 7/025; H04B 5/0037; Y10T 29/4902
See application file for complete search history.

(56) References Cited

U.S. PATENT DOCUMENTS

| | | | |
|---|---|---|---|
| 5,880,662 A | 3/1999 | Person et al. | |
| 5,966,063 A | 10/1999 | Sato et al. | |
| 6,154,114 A | 11/2000 | Takahashi | |
| 6,445,272 B1 | 9/2002 | Mercado et al. | |
| 6,809,623 B2 | 10/2004 | Kyriazidou et al. | |
| 6,914,508 B2 | 7/2005 | Ferencz et al. | |
| 6,996,892 B1 | 2/2006 | Dening et al. | |
| 7,176,776 B1 | 2/2007 | Tantwai et al. | |
| 7,295,096 B2* | 11/2007 | Tamata | H01F 17/0013 336/200 |
| 7,876,288 B1 | 1/2011 | Huang | |
| 8,519,815 B1 | 8/2013 | Sanders | |
| 9,232,893 B2 | 1/2016 | Singh et al. | |
| 9,812,256 B2* | 11/2017 | Yang | H01F 38/14 |
| 9,843,216 B2 | 12/2017 | Ookawa et al. | |
| 10,424,431 B2* | 9/2019 | Valentin | H05K 1/165 |
| 10,431,372 B2* | 10/2019 | Zabaco | H01F 38/14 |
| 2002/0075116 A1 | 6/2002 | Peels et al. | |
| 2003/0164748 A1 | 9/2003 | Kyriazidou et al. | |
| 2006/0125589 A1 | 6/2006 | Tamata et al. | |
| 2007/0159286 A1 | 7/2007 | Huang et al. | |
| 2008/0036536 A1 | 2/2008 | Khorramabadi | |
| 2008/0164840 A1 | 7/2008 | Kato et al. | |
| 2009/0085706 A1 | 4/2009 | Baarman et al. | |
| 2009/0115560 A1 | 5/2009 | Chen et al. | |
| 2011/0050164 A1* | 3/2011 | Partovi | H02J 7/00034 320/108 |
| 2011/0131797 A1 | 6/2011 | Gardner et al. | |
| 2012/0098484 A1* | 4/2012 | Cheng | H02J 50/12 320/108 |
| 2013/0285605 A1 | 10/2013 | Partovi | |
| 2017/0228721 A1 | 8/2017 | Lee et al. | |
| 2017/0287623 A1 | 10/2017 | Valentin | |

FOREIGN PATENT DOCUMENTS

| | | |
|---|---|---|
| CN | 101431868 A | 5/2009 |
| EP | 0413348 A2 | 2/1991 |
| JP | H0897377 A | 4/1996 |
| JP | 2986081 A | 12/1999 |
| JP | 2986081 B2 | 12/1999 |
| JP | 2000022296 A | 1/2000 |
| JP | 2002141224 A | 5/2002 |
| JP | 2004135455 A | 4/2004 |
| JP | 2004515056 A | 5/2004 |
| JP | 2006173145 A | 6/2006 |
| JP | 2008172872 A | 7/2008 |
| JP | 2008205215 A | 9/2008 |
| JP | 2008205216 A | 9/2008 |
| JP | 2010028351 A | 2/2010 |
| JP | 2010258913 A | 11/2010 |
| JP | 2011049492 A | 3/2011 |
| JP | 2011082212 A | 4/2011 |
| WO | 2010129369 A2 | 11/2010 |

OTHER PUBLICATIONS

Achterberg, J. et al., "Coil Array Structures Compared for Contactless Battery Charging Platform," Eindhoven Univ. of Technol., Eindhoven, IEEE Transactions on Magnetics, vol. 44, Issue 5, May 2008, pp. 617-622.

\* cited by examiner

HIGH CURRENT, LOW EQUIVALENT SERIES RESISTANCE PRINTED CIRCUIT BOARD COIL FOR POWER TRANSFER APPLICATION

CROSS-REFERENCE TO RELATED APPLICATIONS

The present application is a continuation of U.S. patent application Ser. No. 15/725,530, filed Oct. 5, 2017, now allowed, which is a continuation of U.S. patent application Ser. No. 14/586,384, filed Dec. 30, 2014, now granted, which is a divisional of U.S. patent application Ser. No. 13/535,059, filed Jun. 27, 2012, now abandoned, which claims the benefit of U.S. Provisional Patent Application No. 61/600,969 filed Feb. 20, 2012 by Jorge Zabaco and entitled "Clever Implementation of Wireless Charging Coil Using Standard Printed Circuit Board Technology," all of which are incorporated herein by reference as if reproduced in its entirety.

BACKGROUND

An electric coil (or simply a "coil") is formed by winding a conductor (usually an insulated solid copper wire) around a non-conductive core to create an inductor. One loop of wire is referred to as a turn, and a coil consists of one or more turns. In electronic circuits, electrical connection terminals referred to as taps are connected to a coil. A completed coil assembly with taps is often called a winding. Coils are used in different applications, such as in power transformers and electromagnets. Coils are also used in inductive charging and resonant inductive coupling applications, where energy is transferred between two objects through inductive coupling, e.g., without a conducting medium between the two objects. In inductive charging, there is a relatively small gap between two coils, which are located on the sender and receiver sides of the energy, e.g., within two respective devices. Inductive charging is considered a short-distance "wireless" energy transfer, since charging is achieved without using wires between the two devices. For example, inductive charging applications include wireless battery charging devices. Resonant inductive coupling is the near field wireless transmission of electrical energy between two coils that are tuned to resonate at the same frequency. Resonant inductive coupling applications can achieve longer energy transfer distances than inductive charging applications. For example, resonant inductive coupling applications include near-field wireless communications, such as radio-frequency identification (RFID) devices.

SUMMARY

In an embodiment, the disclosure includes a method for fabricating an electric coil on a circuit board comprising fabricating on the circuit board a first coil layer comprising a coil trace and a plurality of vias distributed along the length of the coil trace, and overlaying a second coil layer on the first coil layer, wherein the vias of the first coil layer join the first coil layer and the second coil layer.

In another embodiment, the disclosure includes a method for reducing an overall thickness of a multilayer coil for wireless electrical power transfer, comprising fabricating a first coil layer comprising a first winding trace, overlaying and distributing a plurality of vias across the first coil layer, and overlaying on the vias a second coil layer comprising a second winding trace substantially similar to the winding trace, wherein the spaces between the vias are determined to increase the vias coverage of the surfaces of the first coil layer and the second coil layer.

In yet another embodiment, the disclosure includes an apparatus for a multilayer printed circuit board (PCB) coil, comprising a first coil layer of a PCB, a plurality of vias coupled to and distributed to cover substantially the surface of the first coil layer within the PCB, and a second coil layer of the PCB and coupled to the vias to cover substantially the surface of the second coil layer, wherein the vias are positioned between the first coil layer and the second coil layer and enable substantially high current and low equivalent series resistance (ESR) for the multilayer PCB coil.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
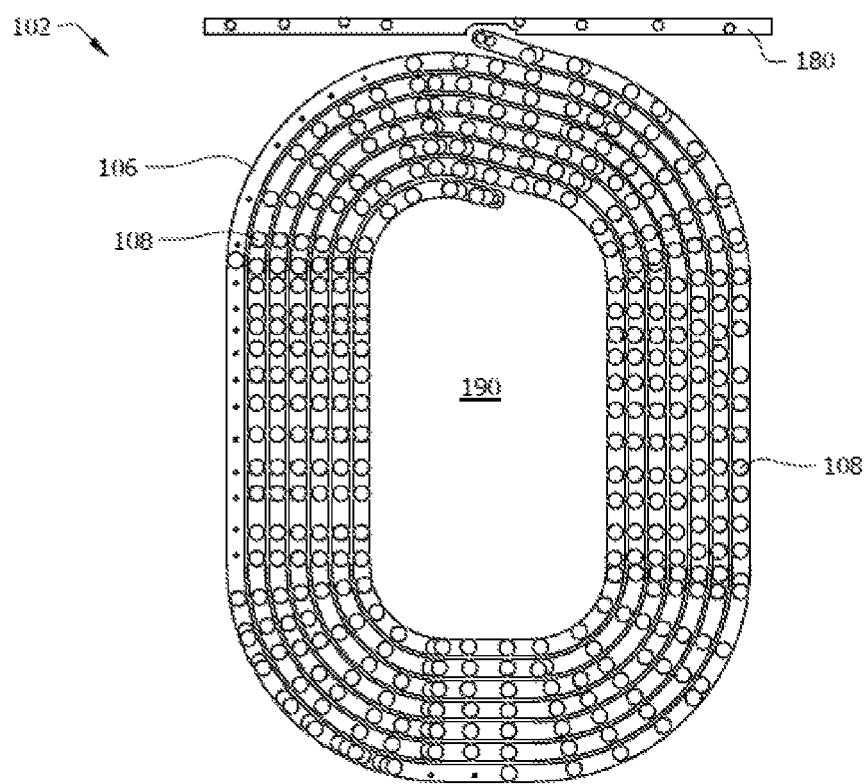
FIG. 1 is a top view of a first coil layer of the multicore design.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Wireless charging coils that are used in wireless charging components may require relatively high current capabilities and relatively low ESR. The high current and low ESR increases power transfer efficiency of the coil. For example, wireless charging coils may be used in inductive charging components for mobile devices (e.g., smartphones) and mobile computers (e.g., laptops and tablets). To meet such requirements, the standard method to fabricate such coils may be based on using and soldering electric or conductive wires onto electric circuit boards of the devices. However, using electric wires to construct charging coils may have limits on the current capability and low ESR resistance that may be achieved, e.g., due to the dimensions and materials involved. For example, to achieve the required high current capabilities and relatively low ESR resistance for wireless (or inductive) charging, coils made out of wires may require a minimum thickness that may not be suitable for some mobile or handheld devices, such as relatively flat (thinner)

smartphones and tablets. A more promising coil design to increase current capability and reduce ESR may be based on integrated circuit fabrication methods, such as using PCB technology and related fabrication processes. Such charging coils may be used in relatively flat mobile devices that have limits on device thickness. The PCB may be a non-conductive substrate that mechanically supports and electrically connects electronic or electrical components using conductive pathways, tracks, or traces, e.g., that may be etched from copper sheets laminated onto the substrate. The PCB may also be coated for protecting the components, e.g., using wax, silicone rubber, polyurethane, acrylic, or epoxy.

Disclosed herein is a fabrication method and apparatus for a multilayer coil design. The method may comprise fabricating multiple coil layers on a PCB and joining the coil layers together using a plurality of vias. The vias may be any structures/material used as vertical electrical connections between different layers of conductors in a physical electronic circuit. The electric coil design may be used for wireless charging application and the method may use PCB technology and fabrication processes. The method may enable and facilitate fabrication of thinner coil layers on a PCB, where the coil traces may be fabricated using available circuit fabrication processes and may be made thinner than typical electric wires. This may also allow the integration of the coil design with other circuit components of a device. The vias that join or link the coil layers may be distributed along the length of the traces of the coil layers to enhance the current capability and lower the ESR of the entire coil design (the multilayer coil), and hence obtain an effective wireless charging coil. The high current and low ESR coil may also be suitable for near-field wireless antenna designs. For example, the coil may be a component of a near-field wireless antenna design in a RFID device. The method and apparatus may also be used in other coil applications or devices that require efficient power transfer and relatively thin design, e.g., since the multilayer coil may be integrated with other circuit components and hence allow a more compact design.

The thinner multilayer coil design may be suitable for portable devices, such smartphones, tablets, and laptops that have thinner designs. The coil fabrication method may have reduced cost since PCB technology is mature and has lower cost in comparison to other fabrication technologies, for example in comparison to constructing coil wires and then soldering the coil wires to a PCB comprising wireless charging circuitry. The electric coil design may also be easier to manufacture using PCB technology, where a single PCB may be needed. Using a single PCB may also eliminate the need to solder the coil to another PCB comprising the wireless charging circuitry. Further, using a single board, where the coil and the circuitry may be integrated during fabrication, may be more reliable than having the two components (the coil and the wireless charging circuitry) soldered to one another.

Figure 2:
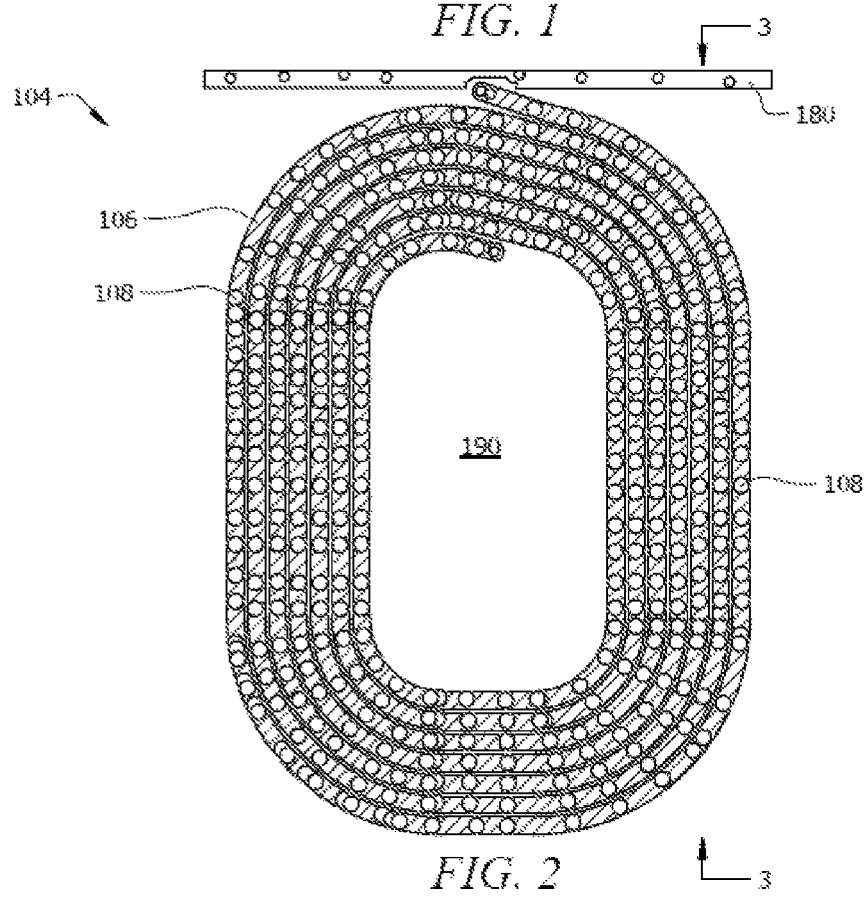
FIG. 2 is a top view of a second coil layer of the multicore design.
Figure 3:
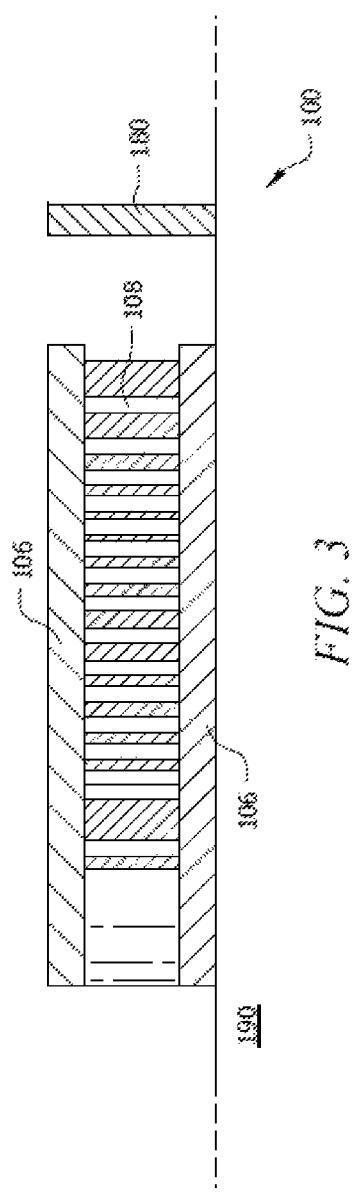
FIG. 3 is a cross sectional view of an embodiment of a multicore design of FIG. 2 taken along line 3-3.

FIGS. 1-3 illustrate an embodiment of a multilayer coil design 100, which may be fabricated using PCB technology. The multilayer coil design 100 may comprise a plurality of coil layers fabricated on a PCB 190. The PCB 190 may be a non-conductive or semiconductor substrate, e.g., a silicon board. The number of coil layers may be determined such that to achieve the required current capability and ESR for the coil application. To achieve relatively high current capabilities and relatively low ESR for wireless charging or near-field communication applications, multiple coil layers may be fabricated and overlaid using PCB technology and fabrication processes. The coil layers may comprise a first coil layer 102 positioned on top of the PCB 190 and a second coil layer 104 overlaid on the first coil layer 102. FIG. 1 illustrates a top view of the first coil layer 102 and FIG. 3 shows a top view of the second coil layer 104. FIG. 3 shows a cross sectional view of the multilayer coil design 100 taken along line 3-3 of FIG. 2. The multilayer coil design 100 may also comprise a plurality of vias 108 positioned between the first coil layer 102 and the second coil layer 104. The first coil layer 102, the second coil layer 104, and the vias 108 may be fabricated using lithography, etching, and deposition processes in any suitable combination.

The first coil layer 102, the second coil layer 104, and optionally any additional number of overlaid layers, which may have substantially similar patterns, may be combined on the PCB 190 into a coil design that achieves a required current capability and ESR for an intended application, e.g., a wireless charging or near-field communications device or component. The first coil layer 102 and the second coil layer 104 may have a substantially similar pattern that includes a winding trace 106. The winding traces of the coil layers may be shaped in a coil pattern. Other suitable patterns that have a winding or coil pattern may also be used. A coil pattern (or a winding trace pattern) may be designed in a first layer, e.g., the first coil layer 102, and then copied or mirrored to a second overlaid layer, e.g., the second coil layer 104, or as many additional overlaid layers as needed to meet current, ESR, and/or impedance required for the wireless charging or near-field communication application. Other design criteria may also be met using the fabrication method and the coil layers design, such as dimension criteria and/or other electric properties requirements. The coil layers may be overlaid (on the same PCB) and combined to form a coil design or a final coil structure that meets the required criteria. For instance, increasing the number of layers may increase the power transfer capability of the multilayer coil design 100. The number and dimensions of the multilayer coil may also be determined to meet a thickness (height of coil layers) requirement for thin portable devices (e.g., smartphones or tablets).

Specifically, to increase current and reduce ESR in the multilayer coil design 100, the coil layers may be joined or otherwise electrically connected using the vias 108, which may be distributed throughout the coil pattern. The vias 108 may have cylindrical or other suitable shapes, which may be vertical with respect to the coil layers (as shown in FIG. 1), extend between adjacent coil layers, and connect the facing surfaces (the traces 106) of the adjacent coil layers. For instance, the vias 108 may be shaped as solid circles distributed to cover substantially the coil pattern (trace 106) of the first coil layer 102, as shown in FIG. 2. A plurality of additional vias 108 may similarly be distributed across the trace 106 of the second coil layer 104 (as shown in FIG. 3), for instance if a third coil layer (not shown) is overlaid on the second coil layer 104 to connect the second coil layer 104 and the third coil layer. The vias 108 may comprise conducting material that joins (electrically) the different coil layers with each other and allows current to flow throughout the multiple coil layers. For instance, the vias 108 may be composed of the same material of the traces of the coil layers. Increasing the number of vias 108 and distributing the vias 108 substantially entirely across two adjacent coil surfaces may increase the current flow between the two adjacent coil traces 106 and hence reduce ESR for the multilayer coil design 100, e.g., in comparison to distributing fewer vias at some portions of the coil surfaces.

Further, the relatively thin coil pattern at each layer may reduce the overall series resistance (the ESR) of the multilayer coil design 100. For example, a coil design comprising two coil layers with traces of about 25 micrometers thickness may have an overall series resistance of about 0.35 ohms or less. The coil traces or layers may have about the same thickness, which may be determined to meet a desired ESR for the multilayer coil design 100. Using multiple layers of coil, which are coupled to each other using the vias 108, may also reduce the width of the multilayer coil design 100, since the coil conducting material (trace material) may be layered in height (along the thickness of the PCB) to occupy a smaller area and achieve about the same inductive property. For example, overlaying a plurality of substantially similar coil traces reduces the overall width of the coil traces in the PCB layers in comparison to fabricating only one coil trace that has substantially the same thickness of one of the overlaid coil traces. The reduced overall width of the coil design may allow using the multilayer coil structure in compact devices, such as handheld devices.

The coil traces 106 and the vias 108 may be aligned properly, e.g., during fabrication, to ensure proper joining of the multiple coil layers. The coil layers may be fabricated and overlaid on the same board using PCB technology and fabrication processes that may be repeated as necessary to construct each layer. Each layer may comprise a coil patterned obtained using traces (e.g., instead of soldiering wires). The traces 106 may comprise electrically one or more conductive materials, such as copper, gold, aluminum, silver, other conductors, or combinations thereof and may be surrounded by non-conductive material such as any dielectric material suitable for PCB fabrication. The multiple layers may also be integrated or overplayed with other circuit components 180 (e.g., charging or wireless transmission circuitry components) on the same board. The other circuit components 180 may be fabricated between or adjacent to the coil layers on the PCB 190.

In one scenario of the fabrication process, a dielectric may be first deposited or sputtered on the PCB 190. For each layer, the trace 106 may be patterned and then etched. The etched patterns may then be filled with electrically conducting material using deposition. The coil layers may be fabricated in similar manner, e.g., using the same patterns, and overlaid accordingly to obtain an overlay of coil patterns (traces 106). The vias 108 between two coil layers may be fabricated via deposition, patterning, etching, and optionally other necessary processes as part of the fabrication step of one of the coil layers (e.g., the bottom coil layer), during the fabrication steps of the two adjacent coil layers, as a separate fabrication step from the coil layers, or combinations thereof. For instance, the vias 108 may be fabricated by patterning the vias 108 on the traces 106 using lithography and then etching. Deposition may be achieved using any vacuum deposition procedures or technologies. The trace 106 may be patterned using lithography (e.g., photolithography, electronic beam lithography, or other lithography technology) or other suitable circuit patterning means (e.g., imprinting). The patterned structure may be etched, e.g., using chemical etching, gas etching, plasma, or other suitable means. The other circuit components 180 may also be fabricated on the PCB 190 and integrated with the coil design or structure.

Figure 4:
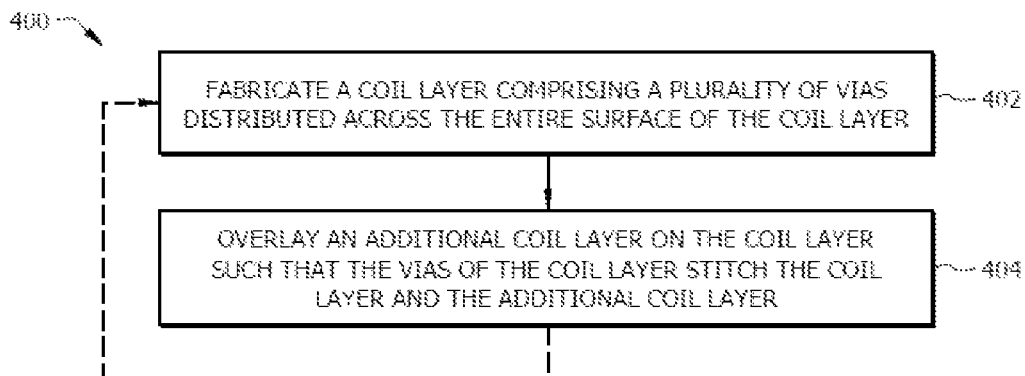
FIG. 4 is a flowchart of an embodiment of a multilayer coil fabrication method.

FIG. 4 illustrates an embodiment of a multilayer coil fabrication method 400 for obtaining a relatively thin coil design with high current and low ESR, such as the multilayer coil design 100, using PCB technology. At block 402, a coil layer may be fabricated comprising a plurality of vias distributed along the length of the coil layer and/or cover a substantial portion of the surface of the coil layer, e.g., the coil trace. The vias may be distributed across the coil pattern or traces and may be positioned to optimize or improve current flow and series resistance. For instance, increasing the number of vias on the coil surface and distributing or arranging the vias proportionally or evenly across the entire surface may increase current flow and reduce resistance at the coil layer. The vias may be distributed along the length of the coil trace to cover about the entire surface except for the spaces between the vias. The spaces between the vias may be arranged to be as small as allowed by the fabrication process to increase the surface coverage of the coil trace by the vias. In an embodiment, the individual vias may have about the same size, surface, and/or dimensions, which may determine the quantity of vias that cover the surface of the coil trace. For example, increasing the surface of the individual vias may reduce the total number of vias on the surface of the coil trace. Alternatively, reducing the surface of the individual vias may increase the total number of vias on the surface of the coil trace. In another embodiment, at least some of the vias may have different sizes and surfaces to optimize or increase current flow and series resistance.

At block 404 an additional coil layer may be overlaid on the coil layer such that the vias of the coil layer join (connect) the coil layer and the additional coil layer. The additional coil layer pattern (or trace) may be substantially similar to the coil layer pattern and the two coil layers may be overlaid to overlap completely or substantially. The additional coil layer may also comprise a plurality of additional vias that may join the additional coil layer to the coil layer, the vias of the coil layer, or to additional overlaid coil layers. The blocks 402 and 404 may be repeated (indicated by the dashed line arrows in FIG. 4) as needed to establish as many coil layers required to meet the current capabilities and series resistance for the entire coil design.

Figure 5:
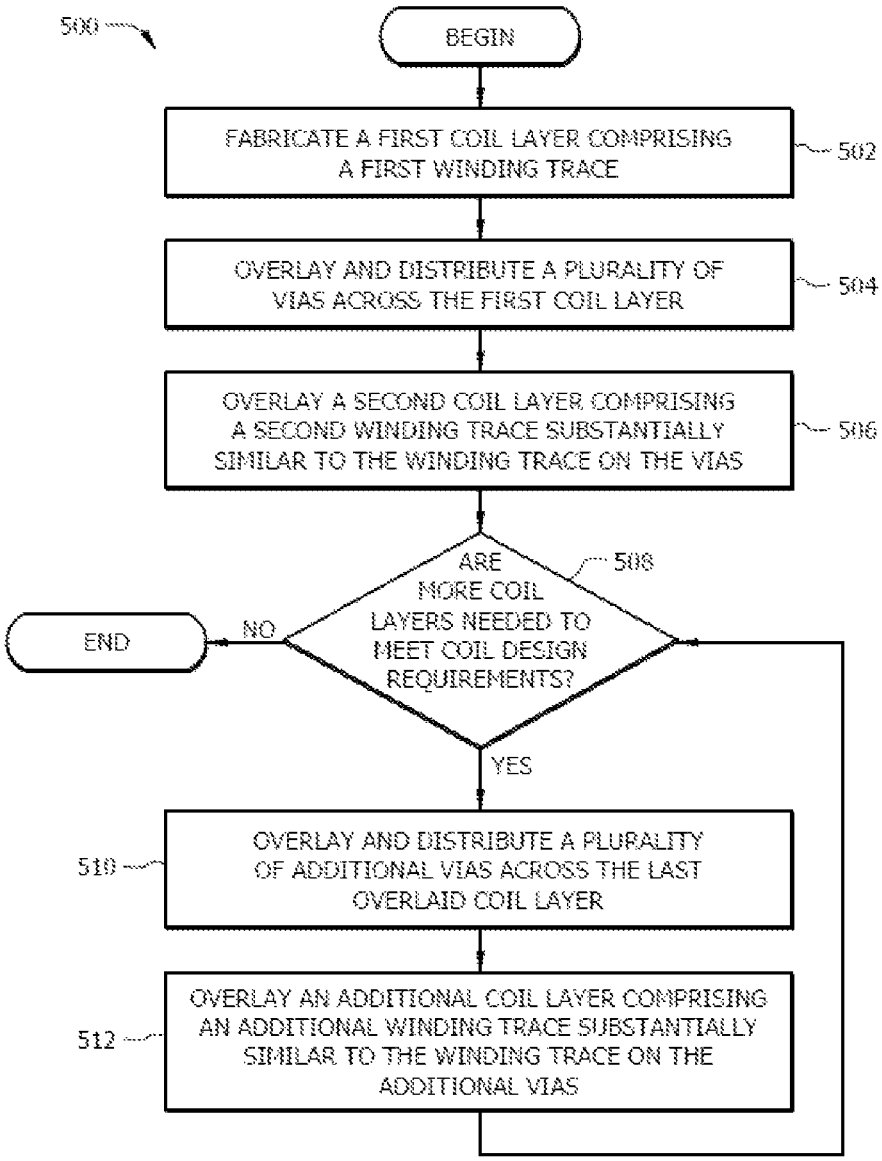
FIG. 5 is a flowchart of another embodiment of a multilayer coil fabrication method.

FIG. 5 illustrates an embodiment of another multilayer coil fabrication method 500 for obtaining a relatively thin coil design with high current and low ESR, such as the multilayer coil design 100. The method 500 may begin at block 502, where a first coil layer comprising a first winding trace may be fabricated, e.g., on a PCB, any other circuit board, a silicon substrate, or a silicon/semiconductor wafer. At block 504, a plurality of vias may be overlaid and distributed across the first coil layer. The vias may be distributed to cover substantially the trace surface along the length of the entire winding trace. At block 506, second coil layer comprising a second winding trace substantially similar to the winding trace may be overlaid on the vias. As such, the vias may couple or join the second coil layer to the first coil layer.

At bock 508, the method 500 may determine whether more coil layers are needed to meet coil design requirements, such as current, resistance, thickness, size, and/or other electrical and physical properties. If more coil layers are needed, the method 500 may proceed to block 510. Otherwise, the method 500 may end. At block 510, a plurality of additional vias may be overlaid and distributed across the last overlaid coil layer, e.g., the second coil layer. The additional vias may be distributed on the second winding trace substantially similar to the vias across the first winding trace. In some scenarios, the first winding trace and the second winding trace may be distributed differently across the corresponding surface (coil layers) to optimize current flow and/or ESR for the entire multilayer coil design. At block 512, an additional coil layer comprising an additional winding trace substantially similar to the winding trace may be overlaid on the additional vias. As such, the additional vias may couple or join the additional coil layer to the previously fabricated and overlaid coil layers to achieve a multilayer coil design with the desired properties.

Figure 6:
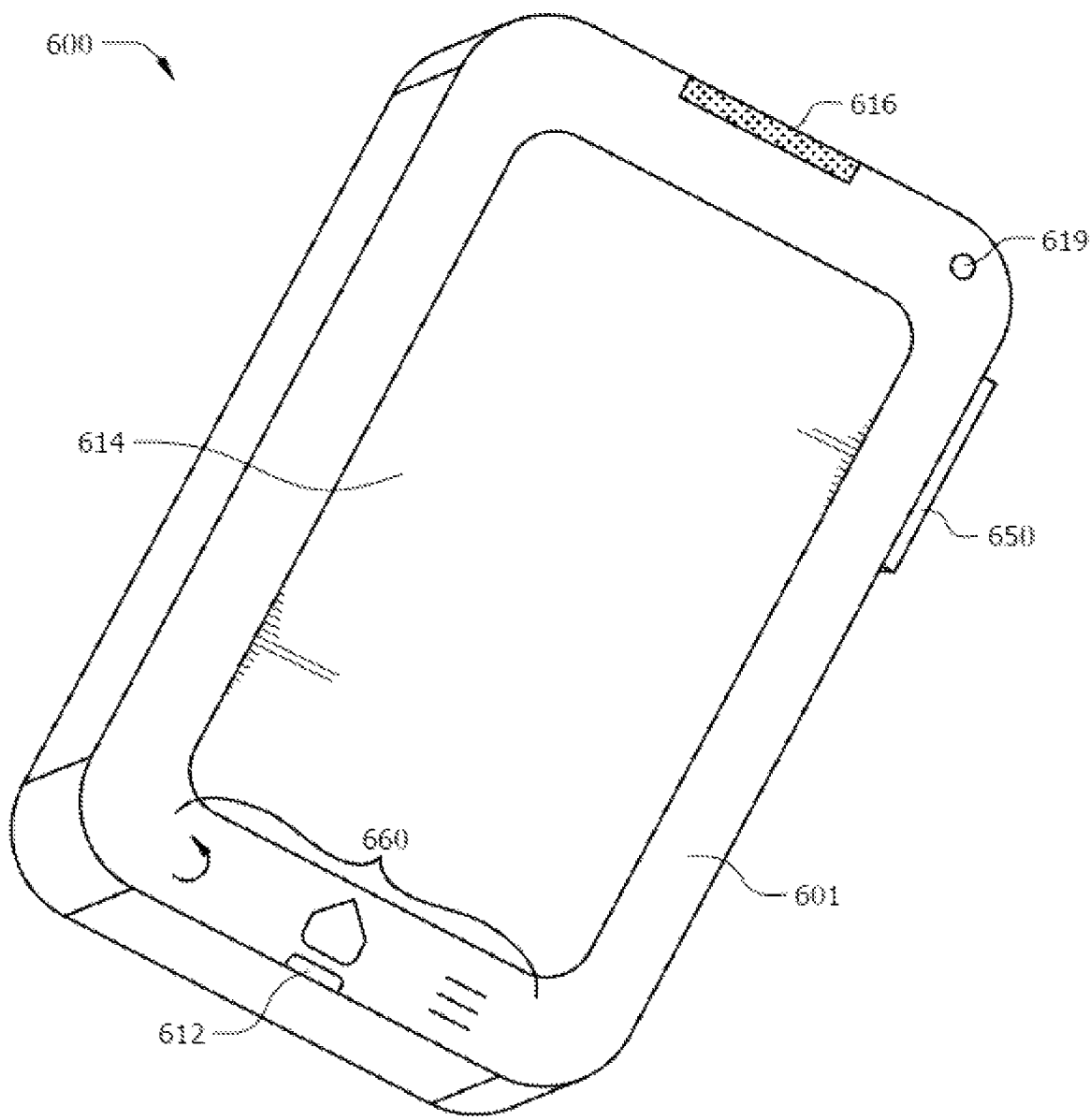
FIG. 6 is a schematic diagram of an embodiment of a handheld device comprising a multilayer coil design.

FIG. 6. is a schematic diagram of an embodiment of a handheld device 600 that may comprise a multilayer coil design, e.g., the multilayer coil design 100. The handheld device 600 may be a smartphone that comprises a wireless charging component (not shown), e.g., a wireless charging circuit that includes the multilayer coil design and may be used for charging a battery (not shown) of the smartphone. For example, the handheld device 600 may be positioned near a charging station comprising an inductive charging coil, thereby charging the handheld device 600. The smartphone may be a relatively thin smartphone (in comparison to smartphone device standards), e.g., may have a thickness of less than about one centimeter. The smartphone may be configured for wireless data/voice communications using cellular networks, Wireless Fidelity (WiFi) networks, or both. In some embodiments, the smartphone may also comprise a near-field component, e.g., a radio-frequency identification device that may also include a multilayer coil design.

The handheld device 600 may comprise a housing 601, a microphone 612, a touchscreen 614, a speaker 616, a front (face) camera 619, one or more volume control buttons 650, and one or more device function buttons 660. The housing 601 may be a casing that forms the external surface of the handheld device 600 and provides protection to the internal components of the handheld device 600, including the wireless charging component, a battery, antenna circuits, and other electronic components. The housing 601 may be a non-conductive casing, such as a plastic casing. The microphone 612 may comprise one or more slots in the housing 601, which may be coupled to a microphone circuit under the housing 601. The touchscreen 614 may be configured to display text, video, and graphics and to receive input from a user by tapping on or touching the touchscreen 614 on a corresponding point (e.g., a text or graphic). The speaker 616 may comprise one or more slots (e.g., circular or otherwise shaped slots) in the housing 601, which may be coupled to a speaker circuit under the housing 601. The front (face) camera 619 may be positioned inside a slot in the housing 601 and may comprise a one or more optical components (e.g., one or more lenses) coupled to a digital video processing circuit inside the housing 601. The volume control buttons 650 may be configured to adjust the volume of the speaker, including increasing, decreasing, and muting the volume. The device function buttons 660 may comprise a plurality of buttons for implementing different functions, such as a home menu button, a return button, a phone list button, a power button, a lock button, and/or other device function buttons.

In some embodiments, the handheld device 600 may comprise an external antenna, such as a metal strip positioned around the sides of the housing 601. The handheld device 600 may also comprise other external components (not shown), such as a rear camera, one or more connection slots for connecting a power cord, a data transfer cord (e.g., a universal serial bus (USB) cable), or a portable memory card, or combinations thereof. At least some of the different internal circuits and components of the handheld device 600 may be fabricated on the same circuit board, e.g., a PCB. The components above of the handheld device 600 may be shaped, arranged, and positioned as shown in FIG. 6 or in any suitable form or design.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A smart device, comprising:
a housing;
a wireless charging coil including a layered structure of electric conductors on a printed circuit board (PCB), wherein the layered structure comprises:
a first layer including a first electrically conductive trace comprising a first turn and a second turn adjacent to the first turn;
a second layer including a second electrically conductive trace comprising a third turn and a fourth turn adjacent to the third turn; and
a plurality of vias coupling the first layer and the second layer, wherein the plurality of the vias include a first via, a second via, and a third via distributed along a length of the first turn, each of the first via, the second via, and the third via electrically connecting the first turn and the third turn, wherein the plurality of the vias further include a fourth via, a fifth via, and a sixth via distributed along a length of the second turn, each of the fourth via, fifth via, and sixth via electrically connecting the second turn and the fourth turn, wherein the plurality of vias enable substantially high current and low equivalent series resistance (ESR) for the wireless charging coil, the layered structure does not include conventional wires; and
one or more charging circuitry components operatively connected to the wireless charging coil.

2. The smart device of claim 1, wherein the first via, second via, third via, fourth via, fifth via, and sixth via are on a curved section of the coil.

3. The smart device of claim 2, wherein the first layer includes a fifth turn adjacent to the second turn and the second layer includes a sixth turn adjacent to the fourth turn, wherein the plurality of vias include a seventh via, an eighth via, and a ninth via distributed along a length of the fifth turn, each of the seventh via, eighth via, and ninth via electrically connecting the fifth turn and the sixth turn, wherein the seventh via, the eighth via, and the ninth via are on the curved section of the coil, wherein first via, the fourth via and the seventh via are aligned, the second via, the fifth via and the eighth via are aligned, and the third via, the sixth via and the ninth via are aligned.

4. The smart device of claim 3, wherein the smart device is thinner than 1 cm.

5. The smart device of claim 4, wherein the smart device has a touch screen, a speaker and a camera.

6. The smart device of claim 1, wherein the smart device is thinner than 1 cm.

7. The smart device of claim 1, wherein the smart device has a touch screen, a speaker and a camera.

8. The smart device of claim 1, wherein the charging coil has an overall series resistance of about 0.35 ohms or less.

9. The smart device of claim 1, wherein the charging coil comprises only two layers.

10. A smart device, comprising:
a housing; and
a wireless charging coil, the coil including a layered structure of electric conductors on a printed circuit board (PCB), wherein the layered structure comprises:
a first layer including a first electrically conductive trace comprising a first turn and a second turn adjacent to the first turn;
a second layer including a second electrically conductive trace comprising a third turn and a fourth turn adjacent to the third turn;
a first plurality of vias coupling the first layer and the second layer, distributed along a length of the first turn, electrically connecting the first turn and the third turn;
a second plurality of vias coupling the first layer and the second layer, distributed along a length of the second turn, electrically connecting the second turn and the fourth turn,
wherein the thickness of the device is less than 1 centimeter.

11. The smart device of claim 10, wherein the first plurality of vias and the second plurality of vias each comprise many vias.

12. The smart device of claim 10, wherein a plurality of the first plurality of vias are aligned with a plurality of the second plurality of vias.

13. The smart device of claim 12, wherein the plurality of aligned vias are on a curved section of the coil.

14. The smart device of claim 10, wherein the charging coil has an overall series resistance of about 0.35 ohms or less.

15. The smart device of claim 10, wherein the charging coil comprises only two layers.

16. A method of charging a mobile device, the method comprising:
inductively charging a battery of the mobile device, the mobile device comprising:
a housing;
a wireless charging coil, the coil including a layered structure of electric conductors on a printed circuit board (PCB), wherein the layered structure comprises:
a first layer including a first electrically conductive trace comprising a first turn and a second turn adjacent to the first turn;
a second layer including a second electrically conductive trace comprising a third turn and a fourth turn adjacent to the third turn;
a first plurality of vias coupling the first layer and the second layer, distributed along a length of the first turn, electrically connecting the first turn and the third turn;
a second plurality of vias coupling the first layer and the second layer, distributed along a length of the second turn, electrically connecting the second turn and the fourth turn,
wherein the thickness of the device is less than 1 centimeter
wherein the mobile device is at least one of a smartphone, laptop, or tablet.

17. The method of claim 16, wherein the wireless charging coil has a high current capability and relatively low equivalent series resistance for charging of the mobile device.

18. The method of claim 16, wherein the charging coil has an overall series resistance of about 0.35 ohms or less.

19. The method of claim 16, wherein the charging coil comprises only two layers.

* * * * *